(12) United States Patent
Choi et al.

(10) Patent No.: US 10,939,091 B1
(45) Date of Patent: Mar. 2, 2021

(54) PROJECTOR DEVICE FOR AUGMENTED REALITY AND METHOD FOR CONTROLLING THE SAME

(71) Applicant: LG ELECTRONICS INC., Seoul (KR)

(72) Inventors: Changho Choi, Seoul (KR); Jaesuk Yoo, Seoul (KR); Sanghyuk Im, Seoul (KR); Jaewan Park, Seoul (KR); Heesoo Kim, Seoul (KR); Rina Lee, Seoul (KR); Changhwa Lee, Seoul (KR); Jongbeom Han, Seoul (KR); Haklim Lee, Seoul (KR); Sangyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/841,064

(22) Filed: Apr. 6, 2020

(30) Foreign Application Priority Data

Feb. 7, 2020 (KR) .......................... 10-2020-0014964

(51) Int. Cl.
| | |
|---|---|
| *G03B 21/14* | (2006.01) |
| *H04N 9/31* | (2006.01) |
| *H04N 13/275* | (2018.01) |
| *G06T 19/00* | (2011.01) |
| *H04N 13/239* | (2018.01) |
| *G06F 3/0481* | (2013.01) |

(52) U.S. Cl.
CPC ....... *H04N 13/275* (2018.05); *G06F 3/04815* (2013.01); *G06T 19/00* (2013.01); *H04N 9/3194* (2013.01); *H04N 13/239* (2018.05)

(58) Field of Classification Search
CPC .... G03B 21/142; G03B 21/145; G03B 21/14; G03B 17/54; H04N 9/3194; H04N 9/3176
See application file for complete search history.

(56) References Cited

U.S. PATENT DOCUMENTS

2018/0249055 A1* 8/2018 Nakatsu ................ G06F 3/0425

\* cited by examiner

*Primary Examiner* — Ryan D Howard
(74) *Attorney, Agent, or Firm* — Birch, Stewart, Kolasch & Birch, LLP

(57) ABSTRACT

Disclosed are a projector device providing augmented reality and a method for controlling the projector device. The projector device includes a body; a projector disposed in the body and configured to project augmented reality information onto a projected region on a predefined object; a camera disposed on the body to be movable relative to the projector, wherein the camera is configured to measure a distance therefrom to the projected region and to sense an input to a sensed region of a predefined size at the measured distance; and a controller configured to control the projector and the camera, wherein the controller is configured to align the sensed region with the projected region, based on a relative position of the sensed region to the projected region, such that the camera receives the input accurately.

13 Claims, 12 Drawing Sheets

(a)  (b)

PROJECTOR DEVICE FOR AUGMENTED REALITY AND METHOD FOR CONTROLLING THE SAME

This application claims the benefit of Korean Patent Application No. 10-2020-0014964, filed on Feb. 7, 2020, which is hereby incorporated by reference as when fully set forth herein.

BACKGROUND

Field

The present disclosure relates to a projector device and a control method thereof, and more particularly, to a projector device configured to present augmented reality, and a method for controlling the projector device.

Discussion of the Related Art

Augmented reality (AR) belongs to a field of virtual reality (VR). AR refers to a computer graphics technique that synthesizes a virtual object or information with a real-world environment, that is, a region on a real object such that the virtual object or information looks like an object in an real environment. Conventional virtual reality only includes a virtual space and a virtual object. However, the augmented reality may synthesize the virtual object with the real world to provide additional information that may not be obtained in the real world.

Such augmented reality may be realized via various smart devices. Among these smart devices, a projector device is configured to project a predefined image on a screen. Since the projector device may project a large image onto a remotely spaced object in a real environment, the projector device advantageously realizes the augmented reality. Typically, in realizing the augmented reality, it is important to correctly recognize a space of the real world onto which the virtual information is to be projected, that is, a projected region, and to correctly receive input to the virtual information to be projected to control the real world. In practice, the projected region must be correctly recognized so that the input to the virtual information to be projected onto the projected region may be correctly received.

For the recognition of the projected region and reception of the input to the virtual information, the projector device may include a light source for irradiating light to the projected region to form a sensed region and a receiver for receiving an input in the formed sensed region. In general, however, the light source of the projector device is configured to form the sensed region at a predetermined distance, i.e., a fixed projection distance, from the projector device to a real object, that is, the projected region. Therefore, when the projection distance is changed, the input to the virtual information may not be correctly received. In particular, when a surface of an actual object in which the projected region is formed is uneven, a small variation in the projection distance may occur, such that an operation corresponding to the input to the virtual information is not accurately performed.

SUMMARY

A purpose of the present disclosure is basically to solve the problem of the conventional projection device as mentioned above. One purpose of the present disclosure is to provide a projector device configured to correctly receive an input to augmented reality information, and a method for controlling the same.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides a projector device for augmented reality, the device comprising: a body; a projector disposed in the body and configured to project augmented reality information onto a projected region on a predefined object; a camera disposed on the body to be movable relative to the projector, wherein the camera is configured to measure a distance therefrom to the projected region and to sense an input to a sensed region of a predefined size at the measured distance; and a controller configured to control the projector and the camera, wherein the controller is configured to align the sensed region with the projected region, based on a relative position of the sensed region to the projected region, such that the camera receives the input accurately.

In one implementation, the projector is configured to present virtual information and a virtual object related to the object as the augmented reality information and/or to present a virtual interface to control the virtual information and/or the virtual object. In one implementation, the projector is configured to have an optical axis tilted towards the camera.

In one implementation, the camera is configured to sense a motion of a predefined input tool input to the sensed region as the input. In one implementation, the camera includes: a light source configured to irradiate predefined light toward the object; and a sensor configured to receive the irradiated light reflected from the object. In one implementation, the camera and the projector are in a line with a vertical axis of the body. In one implementation, the camera is configured to be pivotable about a horizontal axis of the body and relative to the projector.

In one implementation, the controller is configured to move the sensed region such that an entirety of the sensed region is contained within the projected region. In one implementation, the controller is configured to pivot the camera about a horizontal axis of the body by a predefined angle toward the projector such that the sensed region moves to be aligned with the projected region. In one implementation, in order to calculate the angle, the controller is configured to: determine the relative position of the sensed region to the projected region; calculate a spacing between the projected region and the sensed region based on the determined relative position; and calculate the pivoting angle of the camera based on the calculated spacing.

In one implementation, the body includes: a base placed on a predefined surface; a first body mounted to the base and pivotable around a perpendicular axis to the base; and a second body mounted to the first body and pivotable around about a horizontal axis of the first body. In one implementation, the projector and the camera are installed in the second body. In one implementation, the projector is immovably fixed to the second body, and the camera is pivotable relative to the projector.

The features of the above-described implementations may be combined with other embodiments as long as they are not contradictory or exclusive to each other.

Effects of the present disclosure are as follows but are limited thereto:

The projector device according to the present disclosure may move the camera when the sensed region by the camera and the projected region by the projector do not overlap at least partially, thereby to align the sensed region with the projected region. Therefore, all of the inputs to the projected region, that is, the augmented reality information present thereto may be sensed in the aligned sensed region. Thus, the projector device according to the present disclosure may present the augmented reality information stably and reliably.

Effects of the present disclosure are not limited to the above effects. Those skilled in the art may readily derive various effects of the present disclosure from various configurations of the present disclosure.

DETAILED DESCRIPTIONS

Figure 1:
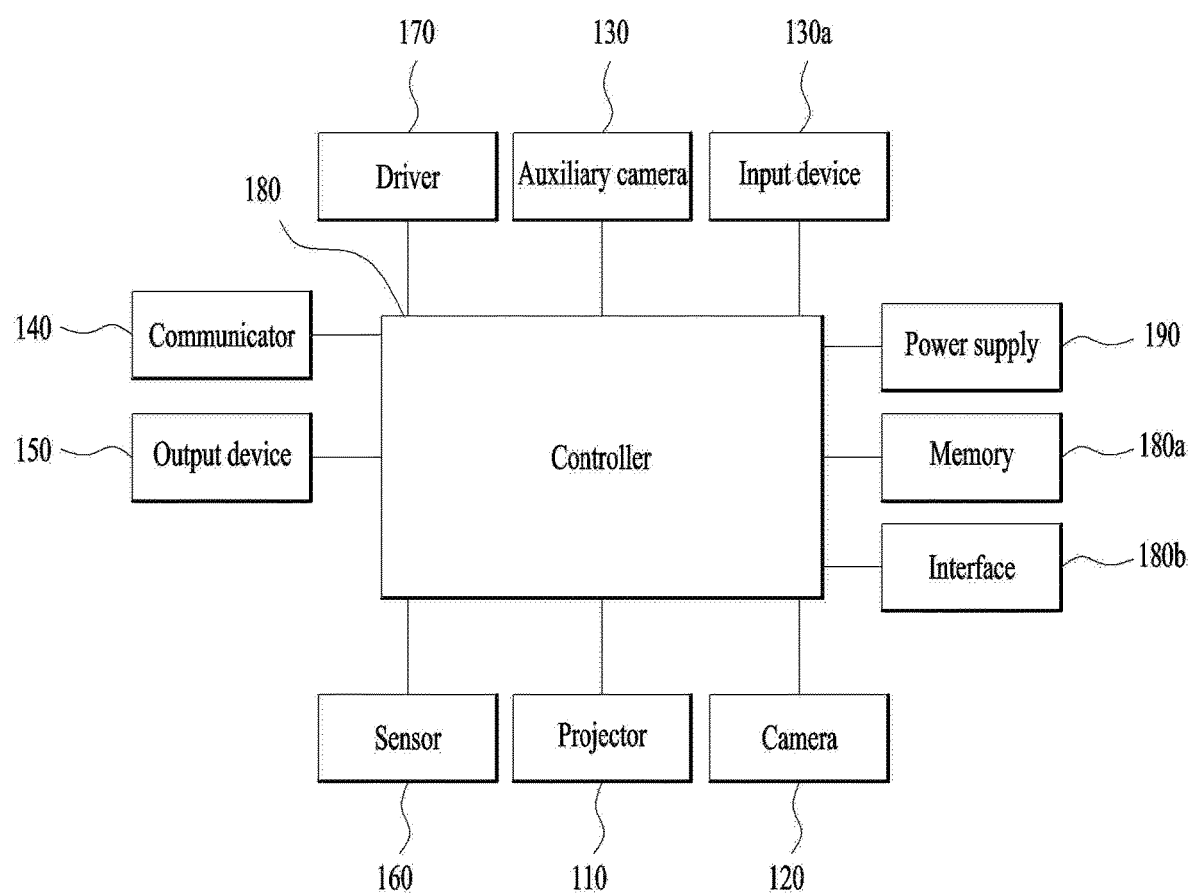
FIG. 1 is a block diagram showing a configuration of a projector device in accordance with the present disclosure.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of a projector device and a control method thereof according to the present disclosure will be described in detail below with reference to the accompanying drawings.

Embodiments described in the present disclosure relate to a projector device that presents augmented reality information and a method of controlling the same. However, a principle and a configuration of the described embodiments may be applied to all devices capable of projecting an image. For example, the embodiments as described below may be applied to mobile phones, smart phones, laptop computers, digital broadcasting terminals, PDA (personal digital assistants), PMP (portable multimedia players), navigation devices, slate PCs, tablet PCs, ultrabooks, and wearable devices such as smart watches, smart glasses, HMDs (head mounted display), and the like.

First, an overall configuration of an embodiment of the projector device described in the present disclosure is described below with reference to the associated drawings. FIG. 1 is a block diagram illustrating a projector device according to the present disclosure. Referring to FIG. 1, a general configuration of the projector device is described as follows.

Components illustrated in FIG. 1 may not be necessary to implement a projector device 100. Thus, the projector device 100 according to the present disclosure may have more or fewer components than those as listed below. Further, not all of actual shapes and structures of components as listed below are illustrated in the drawings. Rather, only shapes and structures of some of important components are shown in the figures subsequent to FIG. 1. However, it will be understood by those skilled in the art that although not all illustrated in the drawing, all of the components as described with reference to FIG. 1 may be included in the projector device 100 to implement functions of the projector device 100.

First, the projector device 100 may include a projector 110. The projector 110 may be configured to present augmented reality information on a real world. More specifically, the projector 110 may be configured to project a predefined size image as augmented reality information on a surface of a real object spaced at a predefined distance from the projector device 100 in the real world. The augmented reality information may include virtual information related to a predefined real object and a virtual object related to the real object. Further, the augmented reality information may include the virtual information and the virtual object, as well as a virtual interface that is configured to interact with or control a real object. The augmented reality information may be stored in the projector device 100 or received from an outside.

The projector 110 may include an image device that receives an image signal and generates an image. The generated image may be enlarged and processed through an optics system or an optics installed in the projector 110 and then be projected outside the projector 110. The projector 110 may include an additional light source to supply light to the image device for amplifying the generated image. The projector 110 may be classified into a CRT (Cathode Ray Tube) type projector, an LCD (Liquid Crystal Display) type projector, a DLP (Digital Light Processing) type projector, a LCoS (Liquid Crystal on Silicon) type projector, a LBS (Laser Beam Steering) type projector, and the like, based on the light source type.

Further, the projector device 100 may include a camera 120. The camera 120 may be configured to measure a distance therefrom to a predefined real object. In more detail, the camera 120 may be embodied as a ToF camera (Time of Flight camera) for measuring the above-mentioned distance. The ToF camera irradiates light having only a region of a predefined wavelength to a predefined sized region and receives light reflected therefrom. The ToF camera detects a relative difference between phases of light beams reflected from the predefined region of the object and then received by pixels of a sensor and measures a time taken for the light to move between the object and the ToF camera based on the difference and then measures the distance therefrom to the object based on the measured time.

Further, the camera 120, that is, the ToF camera may continuously illuminate light and receive reflected light. Thus, the ToF camera may measure a continuous change in a distance from the camera 120 to an object. Further, for the same reason, the camera 120 may detect a motion of a predefined object based on the measured continuous change in the distance. In general, interaction with the virtual information or object may be performed via a motion of a user's hand or other input device, that is, a gesture. Accordingly, the camera 120 may detect an input to the augmented reality information composed of the motion or gesture.

The projector device 100 may include an auxiliary camera 130 in addition to the main camera 120. The auxiliary camera 130 may be embodied as an input device unlike the main camera 120 for the distance measurement and the input detection and may be configured to obtain visual information about an actual environment around the projector device 100, that is, an image. The auxiliary camera 130 may include, for example, a visible image camera configured to acquire an image of a visible light region, that is, a general color image. Further, the auxiliary camera 130 may include an invisible image camera configured to acquire an invisible ray region, for example, an infrared or thermal image. The invisible image camera may be used for night surveillance in addition to the simple acquisition of the information from the surrounding environment. In the projector device 100, the camera 130 may be referred to as an auxiliary camera, while the camera 120 may be referred to as a main camera. Further, the main camera 120 and the auxiliary camera 130 may be referred to as first and second cameras of the projector device 100, respectively.

The projector device 100 may further include an input device 130a configured to acquire other types of information in addition to the cameras 120 and 130 as the devices for inputting the image information. The input device 130a may include an audio input device such as a microphone for inputting an audio signal. Audio data collected through the audio input device may be subjected to a recognition process and may be input as a user's command. Further, the input device 130a may include a user input device configured to receive directly from a user, information and a command such as a physical switch and a physical key and a virtual key provided on a display.

The projector device 100 may include a communicator 140 that communicatively connects the projector device 100 to an external device and a network. The communicator 140 may include a wired communicator and a wireless communicator. The wired communicator may include conventional Ethernet devices. Further, the wireless communicator may include a broadcast receiving module, a mobile communication module, a wireless Internet module, a short range communication module, and a location information module. Using the communicator 140, the projector device 100 may receive the augmented reality information from an external device and a network. Further, the projector device 100 may transmit control information or a signal to the external device through the communicator 140 based on an input to the augmented reality to control the external device.

The projector device 100 may further include an output device 150 configured to output various information in addition to the projector 110 as an image output device. The output device 150 generates various outputs related to visual, audio, or tactile sensation. For example, the output device 150 may include a display for outputting an image, an audio output device such as a speaker, a vibration device for generating vibration, and a light source for emitting light. The display may be disposed on a body of the projector device 100, and may additionally display the augmented reality information to be projected or information related to an operation of the projector device 100, for example, an interface for operation control. The display may implement a touch screen including a touch sensor, and may directly receive an input to a virtual interface as a user input device.

The projector device 100 may further include a sensor 160 configured to receive information about the surrounding environment in addition to the information obtained from the cameras 120 and 130 as the input devices and the input device 130a. The sensor 160 may include various sensors to detect such information. For example, the sensor 160 may include a proximity sensor, an illumination sensor, a touch sensor, a velocity sensor, an acceleration sensor, a magnetic sensor, a gravity sensor (G-sensor), a gyroscope sensor, a motion sensor, a RGB sensor, an infrared sensor (IR sensor), a finger scan sensor, an ultrasonic sensor, an optical sensor, an environmental sensor (for example, a barometric pressure sensor, a humidity sensor, a temperature sensor, a radiation sensor, a heat sensor, a gas sensor, etc.), a chemical sensor (for example, a electronic nose, a healthcare sensor, a biometric sensor, etc.) etc. Based on the information detected by the sensor 160, the projector device 100 may present various augmented reality information.

The projector device 100 may further include a driver 170 configured to move a body of the device 100 in various directions. For example, the driver 170 may include an actuator such as a motor configured to generate power. The driver 170 may further include a support such as a bearing that reliably supports a portion of a moving body. The driver 170 is described in more detail later with reference to a actual structure of the projector device 100.

The controller 180 may be included in the projector device 100 and be configured to control an operation thereof. The controller 180 may be composed of, for example, a substrate, a processor mounted on the substrate, and related electronic components. As illustrated, the controller 180 may be electrically connected to components of the projector device 100. Thus, the controller 180 may control the components for an intended operation. The control may be performed by executing various applications installed in the projector device 100. In an example, the controller 180 may process received information or directly acquired information into the augmented reality information, and may use various applications for such processing. More specific operations of the controller 180 will be described in more detail with reference to the control method as described below.

Further, a memory 180a is included in the projector device 100 and stores therein data supporting various functions of the projector device 100. The memory 180a may store a plurality of application programs or applications that are executed on the projector device 100, and data and instructions for operating the projector device 100. Further, the memory 180a may store therein various augmented reality information received externally or directly obtained by the projector device 100.

Further, an interface 180b serves as a channel to various types of external devices connected to the projector device 100 in addition to communicator 140. The interface 180b includes a wired/wireless headset port, an external charger port, a wired/wireless data port, a memory card port, a port for connecting the projector device 100 to a device having an identification module, an audio I/O (input/output) port, a video I/O (input/output port), an earphone port, etc.

Moreover, a power supply 190 receives power from an external power source or an internal power source to supply the power to each of components included in the projector device 100 under control of the controller 180. The power supply 190 may include a rechargeable battery. This rechargeable battery allows the projector device 190 to have an independent power source and to be conveniently moved to various locations within a real environment.

Figure 2:
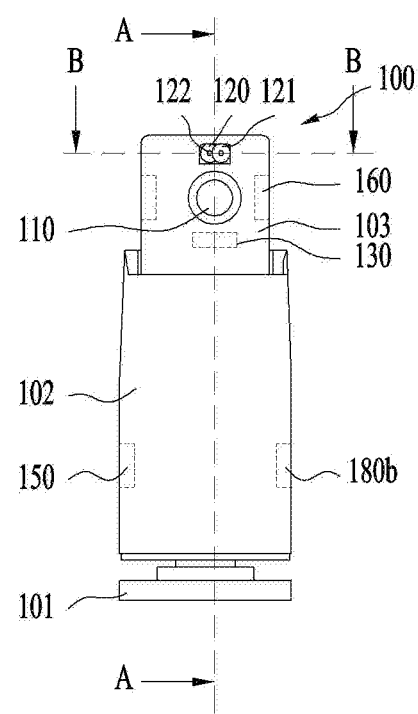
FIG. 2 is a front view of a projector device according to the present disclosure.
Figure 3:
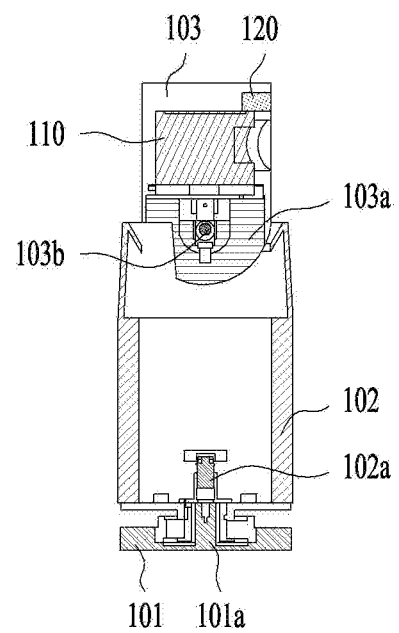
FIG. 3 is a cross-sectional view of the projector device taken along a line A-A in FIG. 2.
Figure 4:
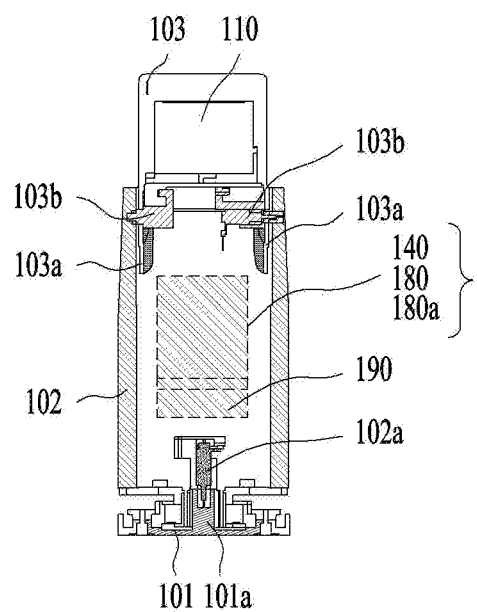
FIG. 4 is a cross-sectional view of the projector device taken in a direction perpendicular to a direction along the line A-A in FIG. 2.
Figure 5:
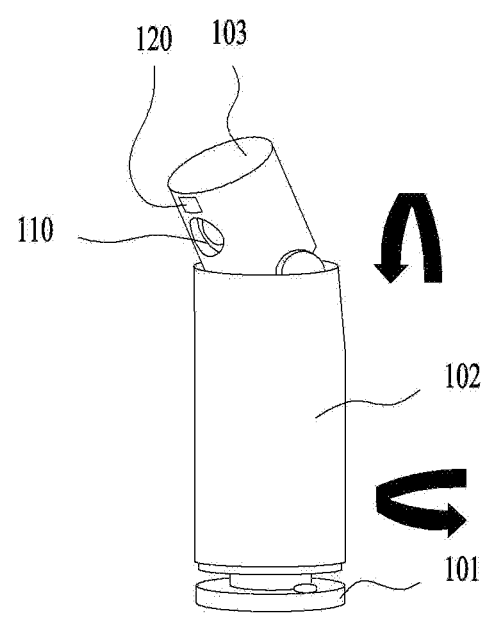
FIG. 5 is a perspective view showing a motion of the projector device.
Figure 6:
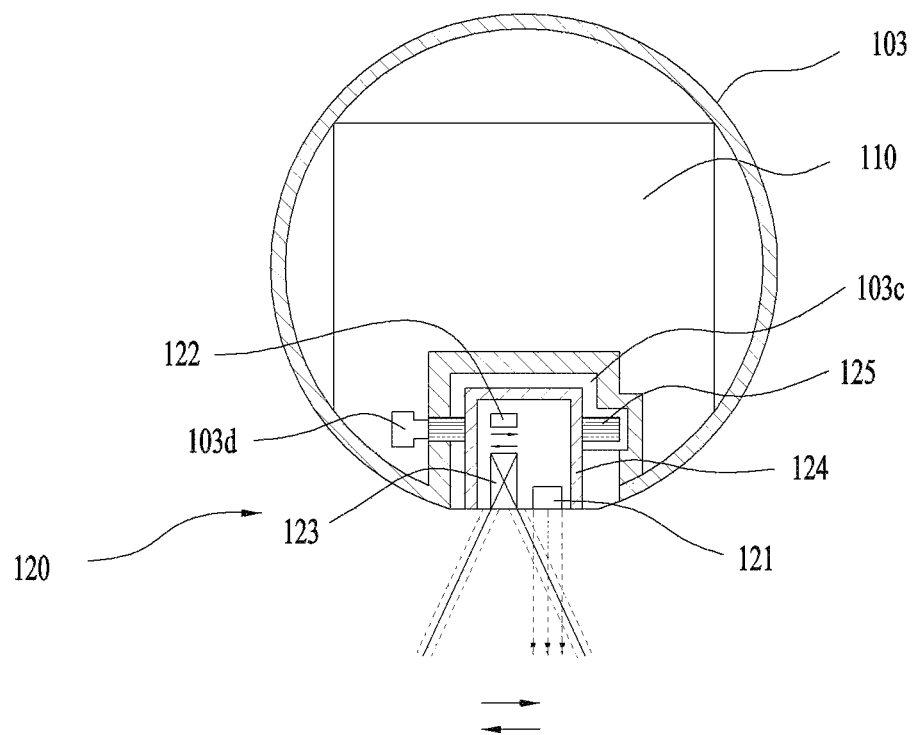
FIG. 6 is a cross-sectional view of the projector device taken along a line B-B in FIG. 2.
Figure 7:
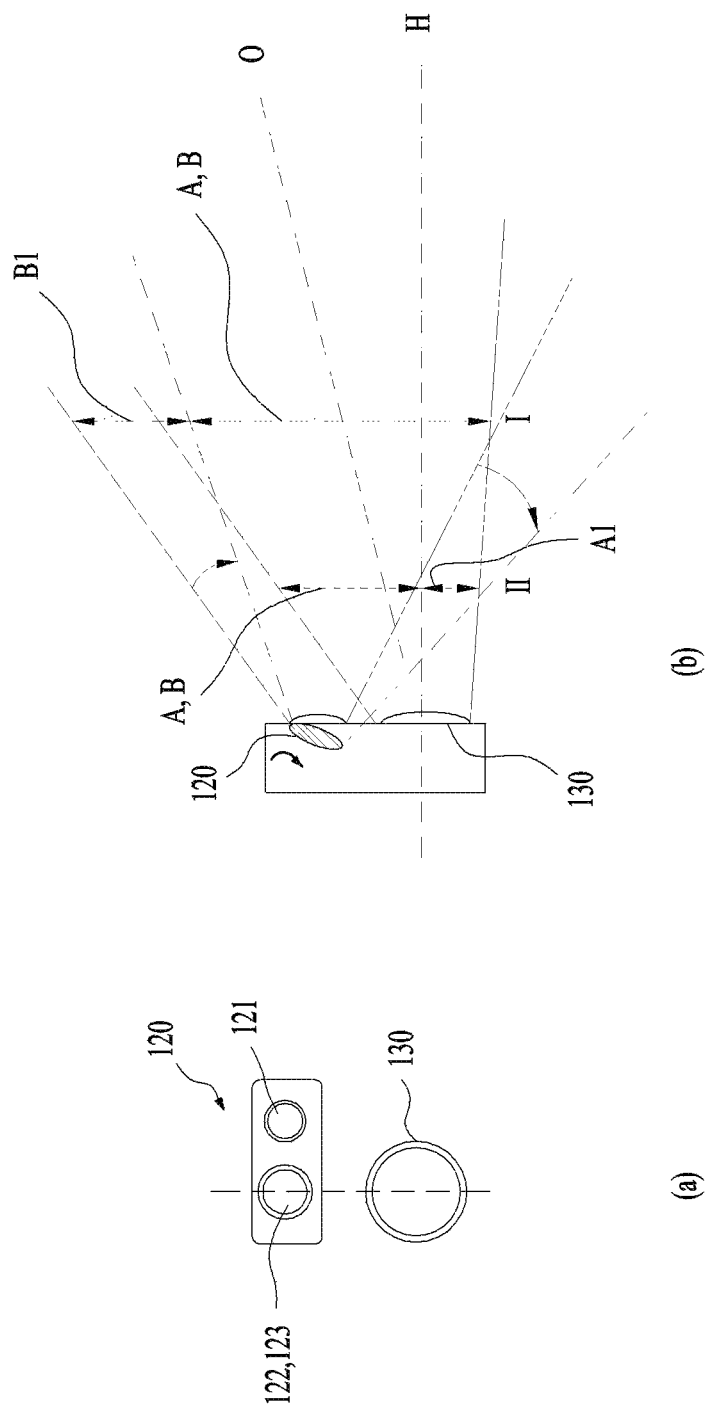
FIG. 7 is a schematic diagram showing to arrangement of a projector device and a camera, and a geometric relationship between a projected region related to the projector device and a sensed region by the camera based on the arrangement of the projector device and the camera.
Figure 8:
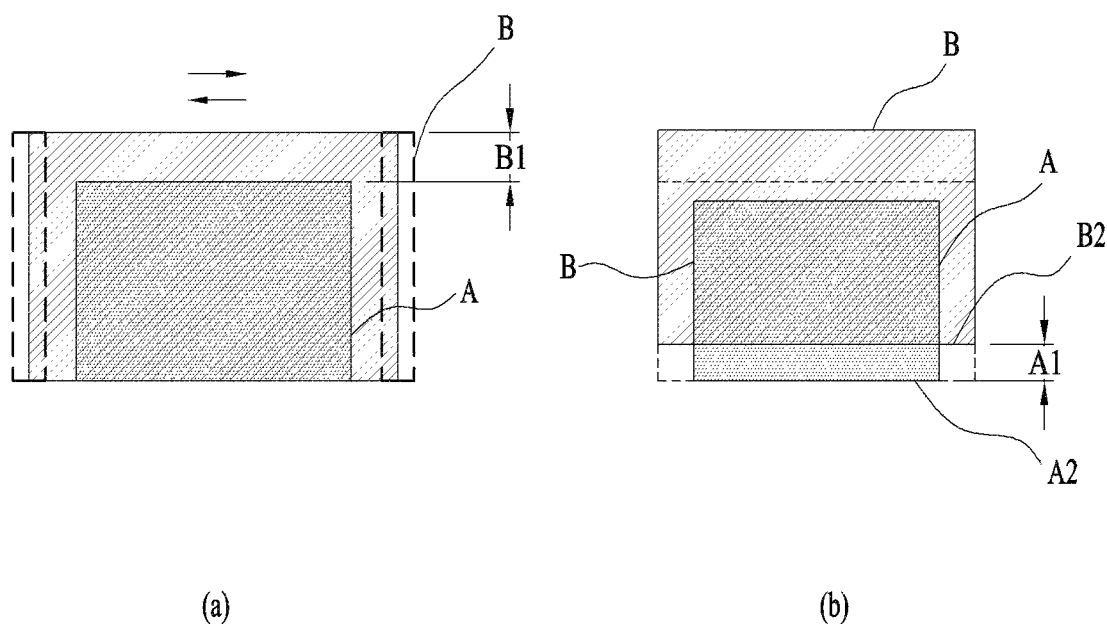
FIG. 8 is a plan view showing a geometric relationship between the projected region related to the projector device and the sensed region by the camera based on the arrangement of FIG. 7.

Following the general configuration of the projector device 100 as described above, a structure of the projector device 100 will be described in detail with reference to the associated drawings. In this regard, FIG. 2 is a front view of the projector device according to the present disclosure. FIG. 3 is a cross-sectional view of the projector device taken along line a A-A in FIG. 2. FIG. 4 is a cross-sectional view of the projector device taken in a direction perpendicular to a direction along the line A-A in FIG. 2. FIG. 5 is a perspective view showing a motion of the projector device. FIG. 6 is a cross-sectional view of the projector device taken along a line B-B of FIG. 2. FIG. 7 is a schematic diagram showing to arrangement of a projector device and a camera, and a geometric relationship between a projected region related to the projector device and a sensed region by the camera based on the arrangement of the projector device and the camera. FIG. 8 is a plan view showing a geometric relationship between the projected region related to the projector device and the sensed region by the camera based on the arrangement of FIG. 7.

First, as illustrated in FIG. 2 to FIG. 6, the projector device 100 is configured to have a compact body 101 to 103 as a whole. Further, as described above, the projector device 100 may have an independent and rechargeable power source, that is, the battery 190. Thus, the projector device 100 may be configured to be freely moved as needed without being spatially constrained to a power source fixed to a building, for example, an electrical outlet.

The projector device 100 as described above may include a base 101 as a body. The base 101 may be placed on a predefined surface in the environment and may reliably support an entirety of the projector device 100.

The projector device 100 may include a first body 102 disposed on the base 101 and configured to pivot around a perpendicular axis to the base 101. The first body 102 may be disposed on a top surface of the base 101. The first body 102 includes a hollow body, thereby having a space defined therein for accommodating various parts therein. Further, the first body 102 may contain a motor 102a fixedly disposed in the internal space thereof and acting as the driver 170. The motor 102a is oriented along a vertical or central axis of the projector device 100. A rotation shaft of the motor 102a may be fixed to a boss 101a of the base 101 which is placed in a fixed manner on a predefined surface of the base 101. Accordingly, when the rotation shaft of the motor 102a rotates, a body of the motor 102a and the first body 102 coupled thereto may rotate about the vertical axis relative to the non-moving base 101.

Further, the projector device 100 may include a second body 103 that pivots about a horizontal axis and is disposed on the first body 102. The second body 103 may be disposed above the first body 102, and may have a hollow body to form a space defined therein for accommodating various parts as in the first body 102. Further, the second body 103 may include a pair of leg legs 103a that are spaced apart from each other at a predefined spacing and extend downwardly as illustrated in FIGS. 3 and 4. Motors 103b may be respectively disposed in the legs 103a. Each motor 103b may be oriented along the horizontal axis of the projector device 100. The rotation shafts of these motors 103b may be coupled to a portion of the first body 102 adjacent thereto. The bodies of the motors 103b may be coupled to the legs 103a, respectively. Thus, as the rotation shafts of the motors 103b rotate, the bodies of the motors 103b and the second body 103 coupled thereto (that is, the legs 103a) will pivot about the horizontal axis relative to the first body 102 coupled to the base 101.

Therefore, due to the configuration as described above, the projector device 100, that is, the body thereof may pivot in various directions as illustrated in FIG. 5. Thus, the projector device 100 may present the augmented reality information into any portion of the environment.

Further, the second body 103 of this projector device 100 may pivot in various directions. As illustrated in FIG. 2, the projector 110 which actually presents the augmented reality information and the camera 120 may be disposed in the second body 103. Further, for the same reason, the auxiliary camera 130 and the sensor 160 may be disposed on the second body 103. Further, at least the output device 150 and the interface 180b which need to be exposed to the outside may be disposed on the first body 102. The communicator 140, the memory 180a and the battery 190 together with the controller 180 may be disposed inside the first body 102.

More specifically, as briefly described above, the projector 110 may be configured to project a predefined size image as the augmented reality information onto the surface of the real object spaced at a predefined distance from the projector device 100. Therefore, the region on the real object surface onto which the augmented reality information is projected from the projector 110 may be defined as a projected region A, as illustrated in FIG. 7 and FIG. 8. Further, the distance between the projector device 100, strictly, the projector 110 and the projected region A may be defined as a projection distance. The projector 110 may project, into the projected region A, the virtual information related to the real object and the image of the virtual object related to the real object as the augmented reality information. Further, the projector 110 may project, into the projected region A, the virtual information and object as well as the virtual interface to control the real object.

Further, the camera 120 measures the distance therefrom to the object, that is, the projected region A formed thereon, as already briefly described above. The camera 120 may sense, as an input, a motion input to the augmented reality information on the projected region A at the measured distance using the user's hand and another input tool. For such distance measurement and input sensing, the camera 120 may be embodied as the ToF camera in an example. The configuration of the ToF camera is exemplarily illustrated in FIG. 6. More specifically, referring to FIG. 6, the camera 120 may include a light source 121 configured to irradiate predefined light. Further, the camera 120 may include a sensor 122 configured to receive external light and generate an electrical signal therefrom. Furthermore, the camera 120 may include an optical system 123 configured to guide light outside the camera to the sensor 122. The parts 121 to 123 of the camera 120 may be housed in a predefined sized housing 124 and may be disposed in a chamber 103c formed in the second body 103 as a module. The light source 121 may actually irradiate the predefined light such as infrared light toward an object on which the projected region A is formed, as illustrated in FIG. 6. The irradiated light may be reflected from the object to the camera 120, and then the reflected light may be received and detected by the sensor 122 through the optical system 123. The camera 120 may measure the time for which the light travels and calculate and measure the distance to the object, that is, the projection distance, based on the velocity of the light and the measured time. Further, according to the same principle, the camera 120 may measure the change in the distance, thereby to detect the input applied onto the projected region A, that is, the motion of the user's hand or the motion of another input tool. As described above, the light source 121 continuously emits light, and, thus, the distance to the projected region A and the motion input on the projected region A may be continuously detected. Thus, the camera 120 may detect the distance to the projected region A and the input to the projected region A in real time. For this reason, even when a slight distance change occurs due to a change in the distance to the object or an unevenness on the surface of the object, the camera 120 may detect the slight distance change accurately. Thus, the camera 120 may detect the input on the projected region A accurately based on the accurate distance detection and measurement.

In one example, as illustrated FIG. 7 and FIG. 8, the camera 120 may have a limited sensed region B in which the input may be sensed, due to the adoption of the optics 123. In order to sense the input in the projected region A, the sensed region B needs to be overlapped with the projected region A. For the arrangement between the projected region A and the sensed region B, the projector 110 and the camera 120 may be arranged physically adjacent to each other. For example, as illustrated in FIG. 2 to FIG. 5, the projector 110 and the camera 120 may be disposed adjacent to each other and in the second body 103. Further, for the same reason, the projector 110 and the camera 120 may be coaxially arranged with each other. The coaxial arrangement may be configured such that the projected region A and the sensed region B are arranged in a line with each other, and may be advantageous for the alignment between these regions A and B. More specifically, as illustrated in FIG. 7, the projector 110, precisely, the optical system thereof, and the camera 120, precisely, the optical system 123 thereof may be arranged adjacent to each other and may be in a line with the same vertical axis. In another example, for the same reason, the projector 110 and the camera 120 may be arranged adjacent to each other and may be in a line with the same horizontal axis. Further, as illustrated in FIG. 7, an optical axis O of the projector 110 may be tilted at a predefined angle relative to the horizontal axis or horizontal plane H and toward the camera 120. For example, as illustrated, the camera 120 may be disposed above the projector 110, and, thus, the optical axis O of the projector 110 may be tilted upwardly relative to the horizontal axis H. Further, since the image is projected along the optical axis O of the projector 110, the projection axis O of the projector 110 is tilted toward the camera 120. Due to this tilt, the projected region of the projector 110 may be tilted toward the sensed region B of the camera 120. This may be very advantageous in aligning the regions A and B with each other so that both overlap each other.

In one example, both of the projector 110 and the camera 120 employ both optics respectively, and have predefined FOVs (Field of View), as illustrated in FIG. 7. Since the FOVs have predefined angles relative to the projector 110 and the camera 120 respectively, the FOVs change as the distances from the projector 110 and the camera 120 to the object respectively change. Thus, the sizes of the projected region A and the sensed region B formed in such FOVs will vary as the distances from the projector 110 and the camera 120 to the object respectively vary as illustrated. Further, as described above, since the projector 110 and the camera 120 are physically spaced apart from each other, the optical axes thereof are spaced apart from each other at a predefined distance and the FOVs thereof are spaced apart from each other at a predefined angular spacing. Thus, the projected regions A formed in the FOVs may be spaced, at a predefined spacing, from each other. The sensed regions B formed in the FOVs may be spaced, at a predefined spacing, from each other. Due to those changes in the sizes of the regions A and B and in the spacing between the regions A and the spacing between the regions B, as illustrated in (b) in FIG. 7, the regions A and B may not be aligned with each other such that the projection device may not correctly receive the input to the presented augmented reality based on the distance between the projector device 100 and the object. For example, referring to (b) in FIG. 7 and (a) in FIG. 8, although at a first position I, there is a dead space B1 in the sensed region B that does not overlap the projected region A, the projected region A is completely contained in the sensed region B. In practice, a user provides a predefined input only to the projected region A containing the augmented reality information. Thus, when the sensed region B completely contains the projected region A, all of inputs applied into the projected region A may be stably sensed regardless of the dead space B1 of the sensed region B. On the other hand, referring to (b) in FIG. 7 and (b) in FIG. 8, at a second position I closer to the projector device 100 than the first position I to the projector device 100, due to the geometric relationship between the FOVs of the projector 110 and the camera 120 as described above, a dead space A1 that does not overlap with the sensed region B may occur in the projected region A. Therefore, when a predefined input is applied into the dead space A1, the camera 120 may not detect the input.

For these reasons, the projector device 100 may be configured to align the sensed region B with the projected region A based on a relative position of the sensed region B with respect to the projected region A in order to receive the applied input. First, referring to FIG. 2 to FIG. 5 and FIG. 6, the camera 120 may be installed in the projector device 100 to be movable relative to the projector 110 so as to adjust a position of the sensed region B. Since the camera 120 and the projector 110 are in a line with the vertical axis, the sensed region B may be easily aligned with the projected region A by pivoting the sensed region B about the horizontal axis. Accordingly, the camera 120 may be installed in the second body 103 so as to be able to pivot relative to the projector 110 about the horizontal axis of the projector device 100 or a body thereof. On the other hand, the projector 110 may be immovably installed in the second body 103 so that the projected region A acting as an alignment reference does not move. However, since the second body 103 itself is movable relative to the first body 102, the projector 110 may be configured to be movable relative to the first body 102.

More specifically, for the pivotable configuration, as illustrated in FIG. 6, the camera 120 may have rotation shafts 125 extending horizontally from both sides of the housing 124 respectively. One of the rotating shafts 125 may be rotatably supported on a wall surface of the second body 103 adjacent thereto. Further, the second body 103 may include a motor 103*d* disposed therein, and a driving shaft of the motor 103*d* may be coupled with the other of the rotation shafts 125. Therefore, when the controller 180 rotates the driving shaft of the motor 103*d*, the housing 124 rotates.

Thus, the internal parts 121 to 123 of the camera 120 may pivot together with the housing 124 toward the projector 110. That is, the camera 120 may pivot toward the projector 110 by a predefined angle about the horizontal axis of the body. This pivot motion allows the sensed region B by the camera 120 to move by a predefined distance toward the projected region A. As indicated by a dotted line in (b) in FIG. 8, the moved sensed region B may completely contain the projected region A at the second point II, as in at the first point I as illustrated in (a) in FIG. 8. Thus, the sensed region B may be aligned to completely overlap with the projected region A. Thus, all of inputs to the augmented reality information in the projected region A may be stably sensed by the camera 120.

Figure 9:
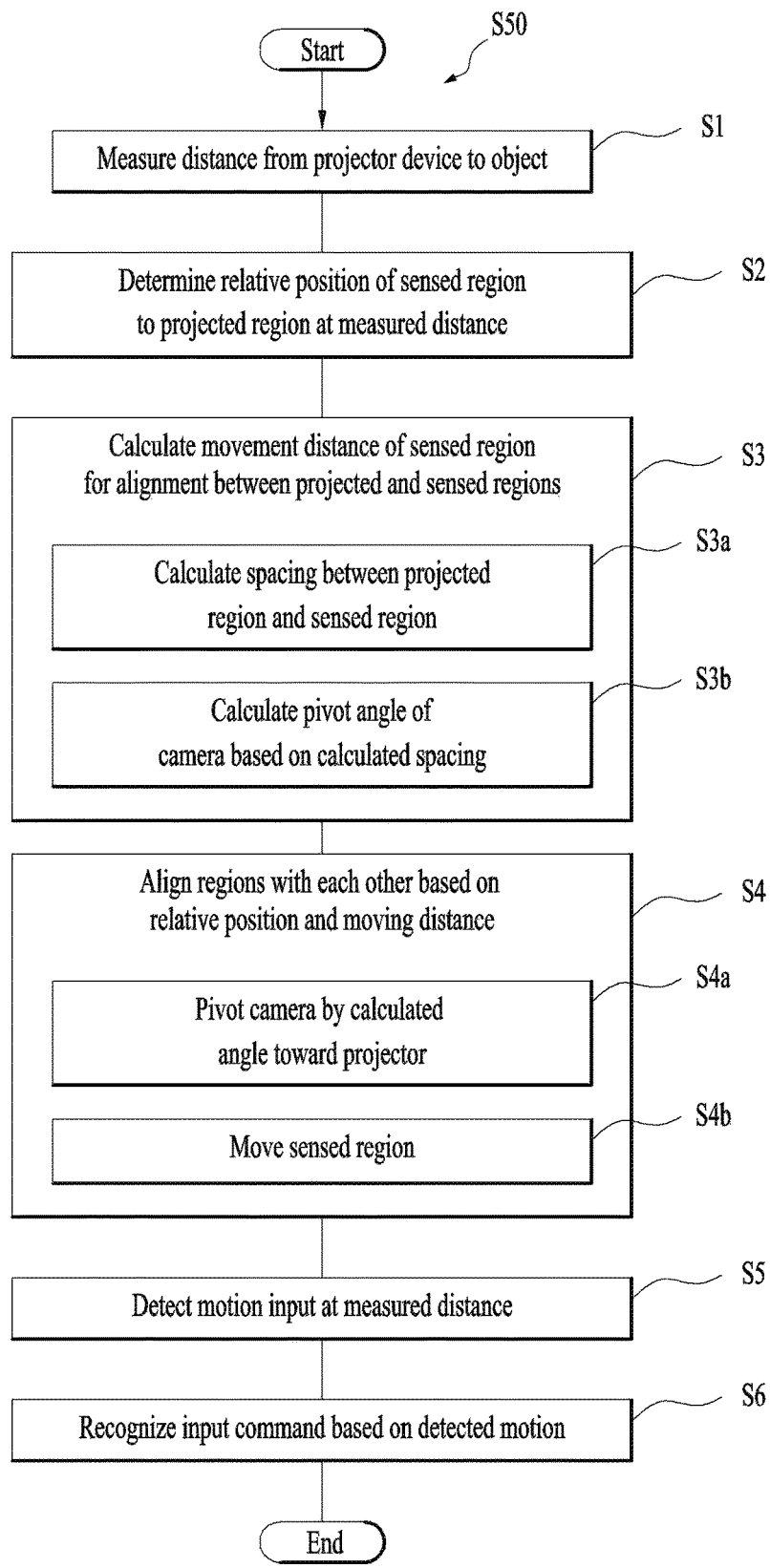
FIG. 9 is a flowchart showing a method for receiving an input by a projector device according to the present disclosure.

The alignment of the regions A and B and the reception of the input based on the alignment are described in more detail below with reference to the associated drawings. FIG. 9 is a flowchart showing a method for receiving the input by the projector device according to the present disclosure. In describing the receiving of the input, reference is made to the relevant FIG. 7 and FIG. 8.

The operations and functions of the components related to the reception method as described below may be regarded as characteristics of the corresponding structural components as well as characteristics of the control method. In particular, the controller 180, that is, a processor may be interchangeable with a control device or a controlling unit. The controller may control all components of the projector device 100 to perform the method as described below. Thus, the controller 180 controls substantially all of the methods and modes as described next in the present disclosure. All steps as described below may be characteristics of the controller 180. For this reason, although not described as being performed by the controller 180, all of following steps and detailed features thereof may be understood as features of the controller 180.

To detect the input to the augmented reality information in the projected region A, the controller 180 may first measure the distance from the projector device 100 to the object S1. In the measuring step S1, the controller 180 may actually measure the distance to the surface of the object on which the projector 110 projects the augmented reality information, that is, the distance to the projected region A using the camera 120. Since the distance measurement using the camera 120 has already been described above, a detailed description thereof will be omitted.

The controller 180 may then determine a relative position of the sensed region B relative to the projected region A at the measured distance S2. As described above, the projector 110 and the camera 120 have predefined FOVs respectively due to the use of optics. These FOVs are non-varying unique characteristic values of the projector 110 and the camera 120 that may be stored in advance in the memory 180*a*. The controller 180 may calculate the sizes of the regions A and B and the relative positions of the regions A and B formed at predefined distances, based on the stored FOV values and the geometric relationship as illustrated in FIG. 7.

After the determination step S2, the controller 180 may calculate a movement distance of the sensed region B for alignment between the projected and sensed regions A and B S3. As described above, due to the FOVs and the physical spacing, at least a portion of the projected region A may not be contained in the sensed region B depending on the distance of the object from the projector device 100. Mismatch or misalignment between the projected region A and the sensed region B may be removed by moving the sensed region B towards the projected region A. For this movement, an appropriate travel distance of the sensed region B needs to be determined in advance.

In this movement distance calculation step S3, first, the controller 180 may calculate the spacing between the projected region A and the sensed region B S3a. In the calculation step S3a, the controller 180 may measure a vertical distance between one B2 of horizontal edges of the sensed region B and a horizontal edge A2 of the projected region A adjacent thereto as illustrated in (b) in FIG. 8. In more detail, the controller 180 may measure a vertical distance between the horizontal edge A2 of the dead space A1 and the horizontal edge B2 of the sensed region B adjacent thereto. The horizontal edge B2 of the sensed region B adjacent to one horizontal edge of the dead space A1 may actually correspond to the other horizontal edge of the dead space A1. Therefore, the controller 180 may measure the vertical distance between the horizontal edges of the dead space A1 facing away each other.

Thereafter, the controller 180 may calculate a pivot angle of the camera 120 based on the calculated spacing S3b. In the calculation step S3b, the controller 180 may calculate the pivot angle of the camera 120 required to move the sensed region B by the spacing, based on the FOV of the camera 120 and the distance to the projected region A.

After the calculating step S3, the controller 180 may align the regions A and B based on the relative positions of the regions A and B and the required moving distance S4. First, the controller 180 may drive the motor 103d of the second body 103 to pivot the camera 120 by the calculated angle toward the projector 110 about the horizontal axis S4a. This pivot may allow the sensed region B to move by the calculated distance toward the projected region A. As indicated by the dotted line in (b) in FIG. 8, the shifted sensed region B may contain the projected region A completely S4b. Therefore, the regions A and B may be aligned with each other to completely overlap each other. Thus, the camera 120 may sense all the inputs to the projected region A through the sensed region B. Further, as illustrated in FIG. 6, the sensor 122 and the optical system 123 of the camera 120 may be moved finely in the horizontal direction. As a result of this movement, the sensed region B may be finely shifted in a horizontal direction as illustrated by a dotted line in (a) in FIG. 8. Thus, after the sensed region B is vertically aligned with the projected region A, the alignment between the sensed region B and the projected region A may be adjusted more accurately.

After the alignment step S4, the controller 180 may detect the input applied by a user or a predefined input tool such as a motion or a gesture at a distance measured using the camera 120. Further, the controller 180 may recognize the input, precisely, the input command, based on the sensed input, that is, the motion or the gesture S6.

In one example, the projector device 100 as described above may always align the projected region A and the sensed region B with each other to accurately receive the input into the augmented reality information. However, in order to provide an improved function, the projector device 100 needs to be subjected to the proper control based on a structure and characteristics thereof. Further, a smart device such as the projector device 100 basically involve interaction with the user in implementing an intended function. Therefore, optimization of various controls may achieve the intended functional improvement including improvement of user environment and user interface more effectively and efficiently. Furthermore, the user experience with the projector device 100 such as ease of use and convenience thereof may be significantly improved. For this reason, a control method of the overall operation of the projector device 100 has been developed by the present inventors and will be described below with reference to FIG. 1 to FIG. 9 and additionally related drawings. Unless otherwise stated, FIG. 1 to FIG. 9 and the above descriptions thereof are basically included and referenced in following descriptions of the control method and the additionally related drawings illustrating the control method.

Figure 10:
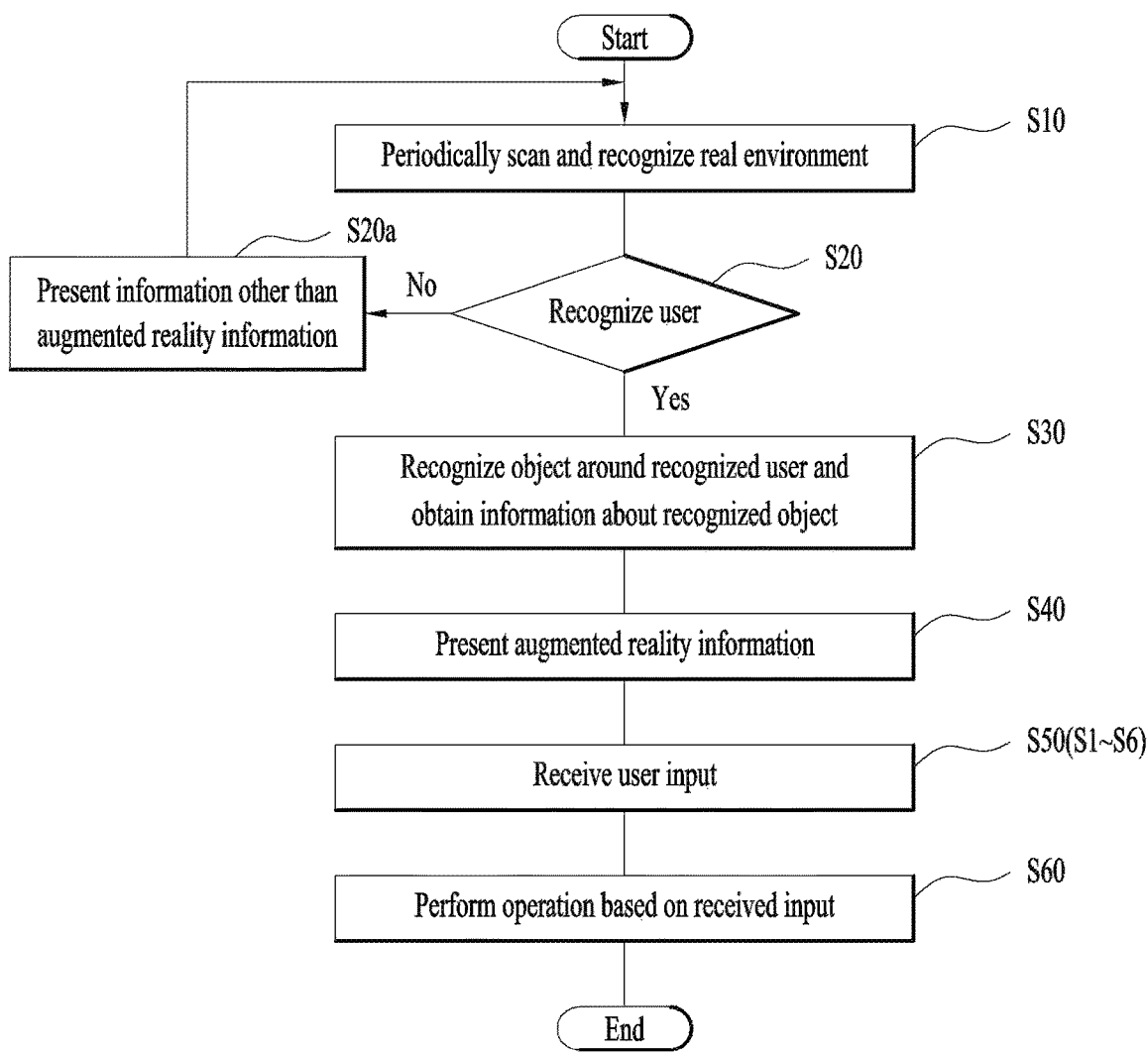
FIG. 10 is a flowchart showing a method for controlling an operation of the projector device according to the present disclosure.
Figure 11:
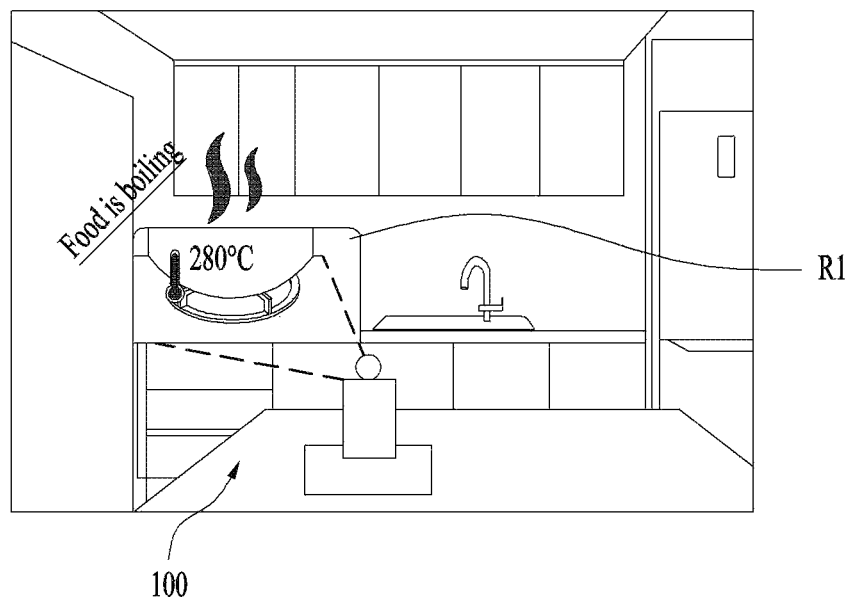
FIG. 11 is a schematic diagram showing an example of a projector device according to the present disclosure as installed in a kitchen.
Figure 12:
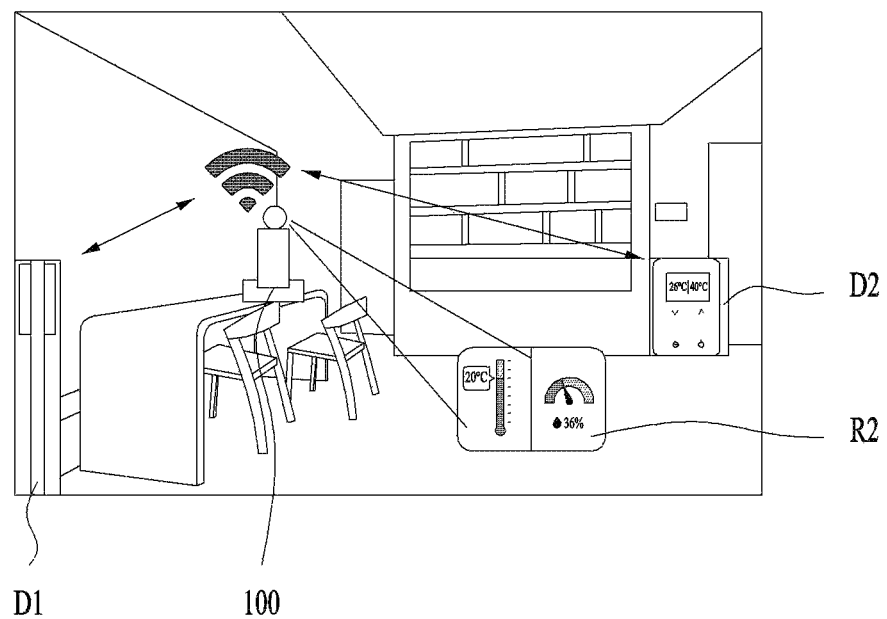
FIG. 12 is a schematic diagram showing an example of a projector device according to the present disclosure as installed in a living room.

FIG. 10 is a flowchart showing a method for controlling an operation of the projector device according to the present disclosure. FIG. 11 is a schematic diagram showing an example of a projector device according to the present disclosure as installed in a kitchen. FIG. 12 is a schematic diagram showing an example of a projector device according to the present disclosure as installed in a living room.

First, the projector device 100, that is, the controller 180 thereof may periodically scan and recognize the real environment S10. In this recognition step S10, the controller 180 may operate the driver 170 to move the first and second bodies 102 and 103 to be uniformly oriented relate to the surrounding environment. During the movement of the first and second bodies 102 and 103, the controller 180 acquires an image of the surrounding environment using the cameras 120 and 130 and analyzes the acquired image to recognize objects in the surrounding environment. Further, the controller 180 may obtain information about the recognized objects through a network or via a direct communication with the corresponding objects using the communicator 140. In another example, the controller 180 may directly obtain the information from the corresponding objects using the input device 130a and the sensor 160 as well as the cameras 120 and 130. For example, as illustrated in FIG. 11, when the projector device 100 is placed in a kitchen, the controller 180 may recognize a cooker, for example, a stove, from the acquired image, and may obtain food being cooked on the recognized stove or a temperature of the stove via communication with the stove. Further, the controller 180 may detect the temperature directly using a thermal image from the cameras 120 and 130 or the sensor 160. Further, as illustrated in FIG. 12, when the projector device 100 is placed in the living room, the controller 180 may recognize an air conditioner D1 and a temperature controller D2 from the acquired image. The controller may receive a temperature in the living room from the air conditioner D1 and the temperature controller D2 or may directly detect the temperature in the living room using the cameras 120 and 130 or the sensor 160. The information thus obtained may be stored in the memory 180a. The controller 180 repeatedly performs series of the above-described scan and recognition steps S10 every predefined time, and the obtained information may be updated in the memory 180a.

Further, since the augmented reality information is presented to the user as visual information, the controller 180 may check the presence or absence of the user during the scan and recognition step S10 as described above. That is, the controller 180 may detect whether the user exists around the projector device 100 based on the various information obtained from the cameras 120 and 130 as well as the input device 130a and the sensor 160.

When it is detected that the user is absent around the projector device 100, the controller 180 may present information other than the augmented reality information, that is, information other than the image information S20a. The controller 180 may output the acquired information about the object, for example, the temperature of the stove of FIG. 11 or the temperature of the living room of FIG. 12 as audio information via the output device 150. Further, when an emergency situation occurs, for example, when the stove temperature or the living room temperature in FIG. 11 and FIG. 12 changes abruptly to a value exceeding a threshold value, the controller 180 may generate an alarm using the output device 150 and other devices to attract the user's attention.

When it is recognized that the user is present around the projector device 100, the controller 180 may recognize an object around the recognized user and obtain information about the recognized object S30. More specifically, when the user is recognized, the controller 180 may continuously track the recognized user. For this tracking, the controller 180 may control the driver 170 to move the first and second bodies 102 and 103 to direct the cameras 120 and 130 toward the user. Further, the controller 180 may recognize an object around the user present within viewing angles of the cameras 120 and 130 and obtain information about the recognized object. Since the recognition and information acquisition have already been described above with reference to the scanning and recognition step S10, further descriptions thereof are omitted below.

Thereafter, the controller 180 may present the augmented reality information R1 and R2 onto the object or a surrounding region around the object S40. More specifically, the controller 180 may project the augmented reality information R1 and R2 onto a predefined projected region A using the projector 110. As described above, the augmented reality information R1 and R2 may be received from the corresponding object or via a network. The projector device 100 may produce the augmented reality information R1 and R2 based on information obtained directly using a sensor or the like. For example, as illustrated in FIG. 11, the projector device 100 may project virtual information and object related to the temperature of the stove as the augmented reality information R1. Further, as illustrated in FIG. 12, the projector device 100 may project virtual information and object related to the temperature of the living room as the augmented reality information R2.

Subsequently, when the user applies a predefined input to the provided augmented reality information R1 and R2, the controller 180 may receive the input S50. Since the input receiving step S50 has been described in detail with reference to the steps S1 and S6 of FIG. 9, further descriptions thereof will be omitted.

Thereafter, the controller 180 may perform an operation based on the received input S60. More specifically, the controller 180 may change the augmented reality information R1 and R2 based on a user's command indicated by the received input. Further, the controller 180 may transmit a signal for controlling the object through the communicator 140 based on the user's command. For example, in FIG. 11, the controller 180 may control an operation of the stove for adjustment of the temperature of the stove via communicating with the stove using the communicator 140. Further, in FIG. 12, the controller 180 may control an operation of the air conditioner D1 and/or the temperature controller D2 to control the temperature of the living room via communicating therewith using the communicator 140.

Effects as not described herein may be derived from the above configurations. The relationship between the above-described components may allow a new effect not seen in the conventional approach to be derived.

In addition, embodiments shown in the drawings may be modified and implemented in other forms. The modifications should be regarded as falling within a scope of the present disclosure when the modifications is carried out so as to include a component claimed in the claims or within a scope of an equivalent thereto.

What is claimed is:

1. A projector device for augmented reality, the device comprising:
   a body;
   a projector disposed in the body and configured to project augmented reality information onto a projected region on a predefined object;
   a camera disposed on the body to be movable relative to the projector, wherein the camera is configured to measure a distance therefrom to the projected region and to sense an input to a sensed region of a predefined size at the measured distance; and
   a controller configured to control the projector and the camera,
   wherein the controller is configured to align the sensed region with the projected region, based on a relative position of the sensed region to the projected region, such that the camera receives the input accurately.

2. The projector device of claim 1, wherein the projector is configured to present virtual information and a virtual object related to the object as the augmented reality information and/or to present a virtual interface to control the virtual information and/or the virtual object.

3. The projector device of claim 1, wherein the projector is configured to have an optical axis tilted towards the camera.

4. The projector device of claim 1, wherein the camera is configured to sense a motion of a predefined input tool input to the sensed region as the input.

5. The projector device of claim 1, wherein the camera includes:
   a light source configured to irradiate predefined light toward the object; and
   a sensor configured to receive the irradiated light reflected from the object.

6. The projector device of claim 1, wherein the camera and the projector are in a line with a vertical axis of the body.

7. The projector device of claim 1, wherein the camera is configured to be pivotable about a horizontal axis of the body and relative to the projector.

8. The projector device of claim 1, wherein the controller is configured to move the sensed region such that an entirety of the sensed region is contained within the projected region.

9. The projector device of claim 1, wherein the controller is configured to pivot the camera about a horizontal axis of the body by a predefined angle toward the projector such that the sensed region moves to be aligned with the projected region.

10. The projector device of claim 9, wherein, in order to calculate the angle, the controller is configured to:
    determine the relative position of the sensed region to the projected region;
    calculate a spacing between the projected region and the sensed region based on the determined relative position; and
    calculate the pivoting angle of the camera based on the calculated spacing.

11. The projector device of claim 1, wherein the body includes:
    a base placed on a predefined surface;
    a first body mounted to the base and pivotable around a perpendicular axis to the base; and
    a second body mounted to the first body and pivotable around about a horizontal axis of the first body.

12. The projector device of claim 11, wherein the projector and the camera are installed in the second body.

13. The projector device of claim 12, wherein the projector is immovably fixed to the second body, and the camera is pivotable relative to the projector.

\* \* \* \* \*